United States Patent
Shimakawa

(10) Patent No.: US 9,599,776 B2
(45) Date of Patent: Mar. 21, 2017

(54) OPTICAL COUPLING MEMBER

(71) Applicant: SUMITOMO ELECTRIC INDUSTRIES, LTD., Osaka-shi, Osaka (JP)

(72) Inventor: Osamu Shimakawa, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/632,033

(22) Filed: Feb. 26, 2015

(65) Prior Publication Data

US 2015/0247977 A1 Sep. 3, 2015

(30) Foreign Application Priority Data

Feb. 28, 2014 (JP) ................... 2014-038907

(51) Int. Cl.
*G02B 6/38* (2006.01)
*G02B 6/02* (2006.01)

(52) U.S. Cl.
CPC ......... *G02B 6/3825* (2013.01); *G02B 6/3851* (2013.01); *G02B 6/02042* (2013.01); *G02B 6/3812* (2013.01); *G02B 6/3869* (2013.01)

(58) Field of Classification Search
CPC .................................................. G02B 6/3825
See application file for complete search history.

(56) References Cited

U.S. PATENT DOCUMENTS

| 8,801,301 B2 | 8/2014 | Bradley et al. |
| 8,858,089 B2 | 10/2014 | Bradley et al. |
| 2002/0197018 A1* | 12/2002 | Lampert ............ G02B 6/3825 385/76 |
| 2011/0229085 A1* | 9/2011 | Bradley ............ G02B 6/3885 385/78 |
| 2012/0219255 A1 | 8/2012 | Bradley et al. |
| 2014/0205241 A1* | 7/2014 | Nielson ............ G02B 6/3825 385/66 |
| 2014/0219609 A1 | 8/2014 | Nielson et al. |
| 2014/0294350 A1 | 10/2014 | Bradley et al. |

FOREIGN PATENT DOCUMENTS

| JP | 3369057 B2 | 1/2003 |
| JP | 2014-106296 A | 6/2014 |
| JP | 2014-106440 A | 6/2014 |
| JP | 2014-182229 A | 9/2014 |
| JP | 2015-001570 A | 1/2015 |
| WO | WO-2014/201280 A1 | 12/2014 |

* cited by examiner

*Primary Examiner* — Sung Pak
*Assistant Examiner* — Hoang Tran
(74) *Attorney, Agent, or Firm* — Drinker Biddle & Reath LLP

(57) ABSTRACT

An optical coupling member includes an adapter and an optical connector. The optical connector has a ferrule, a connector housing, and a holding member. The holding member allows relative movement between the connector housing and the ferrule, and holds a relative angle around a central axis between the connector housing and the ferrule. The connector housing has a contact portion including a contact surface. The adapter has a sleeve and an adapter housing. The ferrule is inserted into the sleeve while the contact surface contacts with the adapter housing for elastically deforming the contact portion.

10 Claims, 13 Drawing Sheets

OPTICAL COUPLING MEMBER

BACKGROUND OF THE INVENTION

Field of the Invention

An aspect of the present invention relates to an optical coupling member.

Related Background Art

In Patent Literature 1 (Japanese Patent No. 3369057), an optical connector for a polarization-maintaining fiber configured to precisely match an angle around an axis of a polarization-maintaining fiber is disclosed.

SUMMARY OF THE INVENTION

In an optical connector used in an optical fiber such as a polarization-maintaining fiber, a multi-core fiber, or the like, precise restriction of an angle around a central axis of the optical fiber is required. In the polarization-maintaining fiber, in order to maintain a polarization plane of light, angle deviation around a central axis should be suppressed to within a range of about ±3°. In the multi-core fiber, in order to efficiently optically couple a plurality of cores, angle deviation around a central axis should be suppressed to within an angle range of about ±1°. Meanwhile, in order to prevent axial deviation due to an external force, play of a ferrule in the optical connector should also be maintained without completely fixing a position of the ferrule.

The optical connector disclosed in Patent Literature 1 includes a member configured to restrict a relative angle between a housing and the ferrule while maintaining the play of the position of the ferrule in order to precisely match the angle around the central axis of the polarization-maintaining fiber. However, since a gap is present between the optical connector and an adapter in which the optical connector is inserted, in only the structure disclosed in Patent Literature 1, the angle deviation around the central axis cannot be sufficiently suppressed.

An optical coupling member according to an aspect of the present invention includes an optical connector; and an adapter into which the optical connector is inserted to an insertion direction, the optical connector includes: a ferrule attached to an end portion of an optical fiber; a connector housing for accommodating the ferrule, and the connector housing having an outer surface facing to an inner surface of the adapter, and a contact portion formed at the outer surface and including a contact surface inclined with respect to the insertion direction; and a holding member formed in the connector housing, and configured to hold a relative angle around a central axis of the optical fiber between the connector housing and the ferrule, and configured to allow relative movement between the connector housing and the ferrule in two directions perpendicular to the central axis and crossing each other at right angles, the adapter includes: a sleeve into which the ferrule is inserted; and an adapter housing configured to accommodate the sleeve and define the inner surface, wherein the ferrule is inserted into the sleeve while the contact surface contacts with the adapter housing for elastically deforming the contact portion.

DESCRIPTION OF THE EMBODIMENTS

Figure 1:
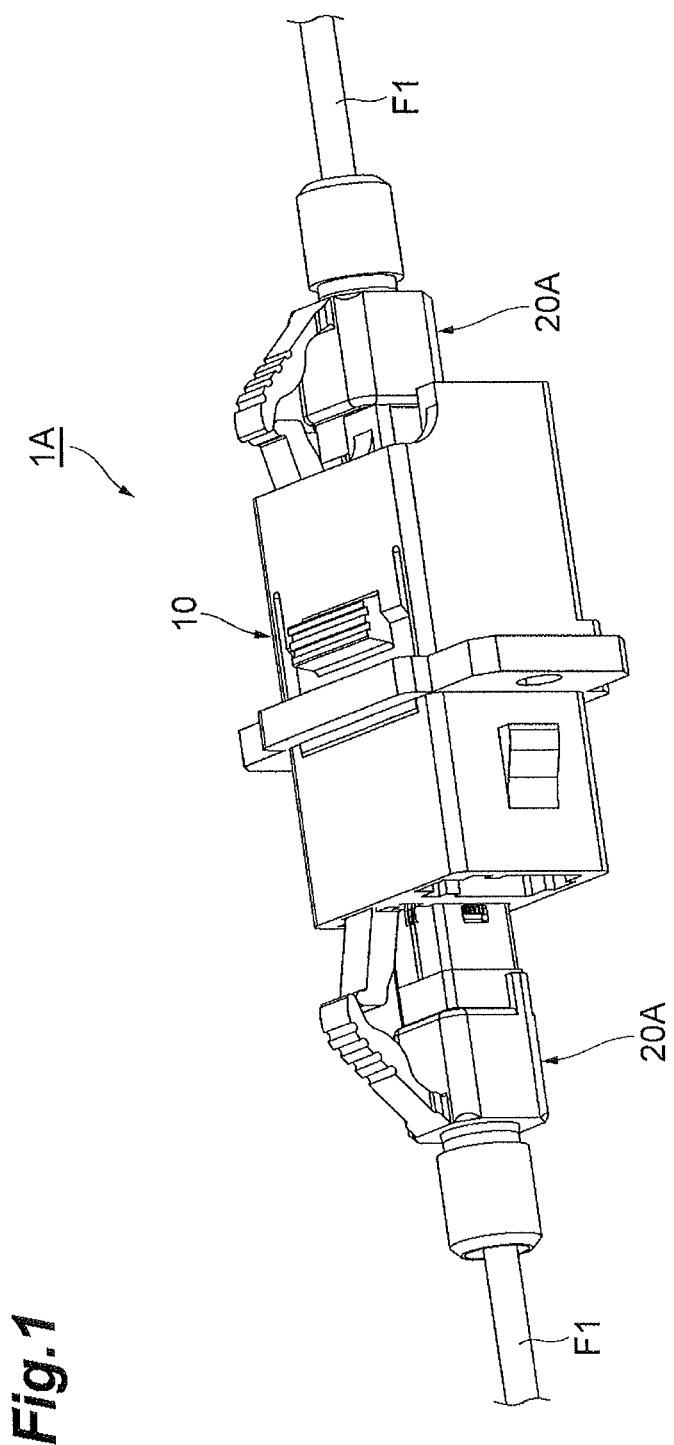
FIG. 1 is a perspective view showing an appearance of an optical coupling member according to an embodiment.

Hereinafter, a specific example of an optical coupling member according to an embodiment of an aspect of the present invention will be described with reference to the accompanying drawings. Further, the aspect of the present invention is not limited to the following example. The aspect of the present invention is represented by each of the following claims, and means that all modifications are made without departing from equivalent meaning and spirit of each of the claims. In the following description, the same reference numerals are designated to the same elements in the following drawings, and overlapping description thereof will be omitted.

Figure 2:
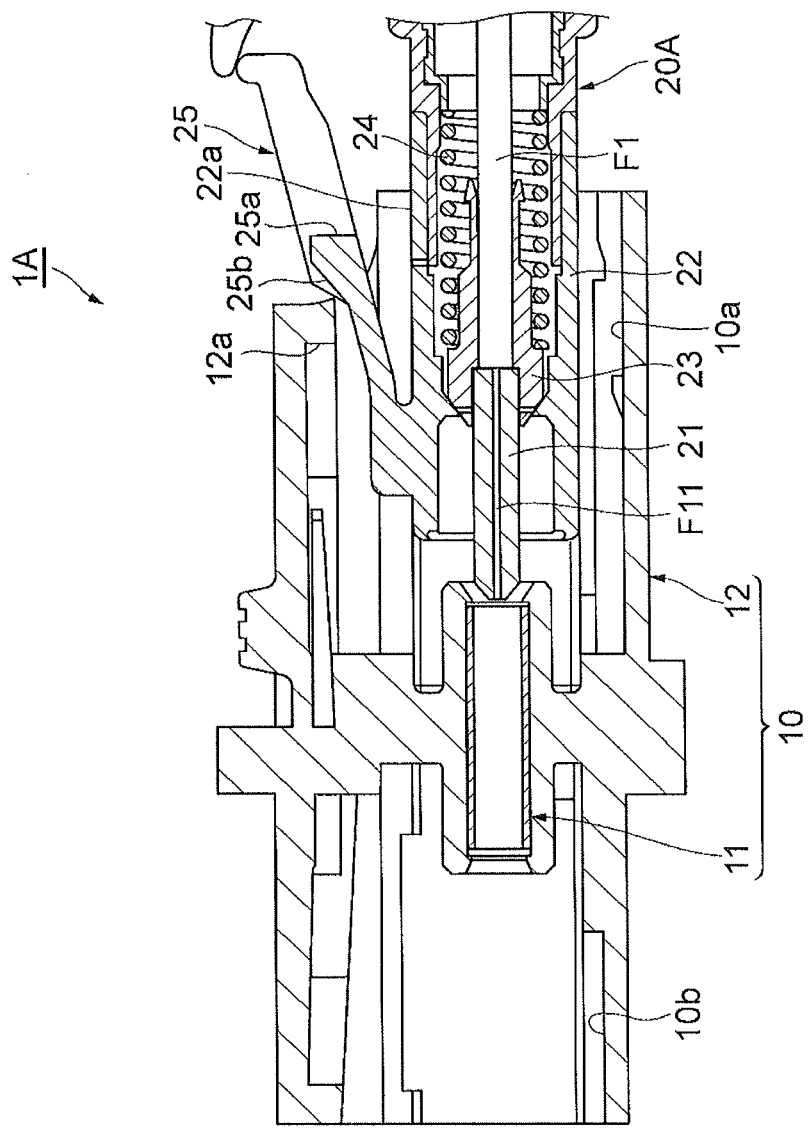
FIG. 2 is a cross-sectional view showing a configuration of the optical coupling member, showing a side section including a central axis of an optical fiber.
Figure 3:
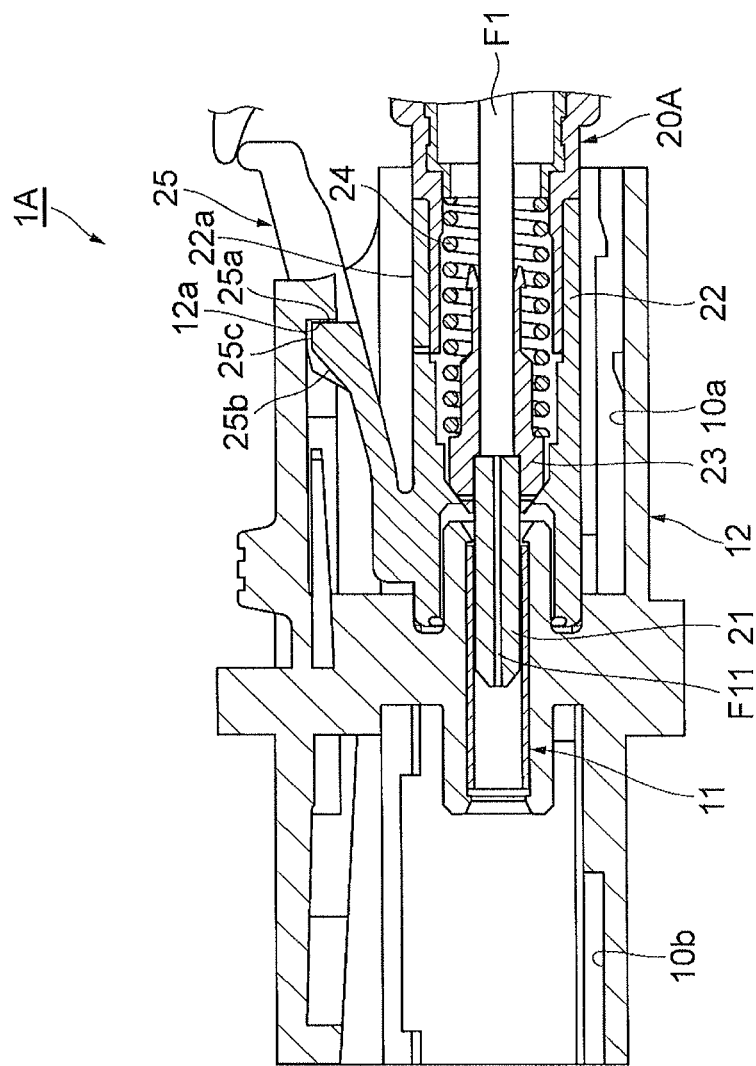
FIG. 3 is a cross-sectional view showing a configuration of the optical coupling member, showing a side section including the central axis of the optical fiber.

FIG. 1 is a perspective view showing an appearance of an optical coupling member 1A according to an embodiment. FIGS. 2 and 3 are cross-sectional views showing a configuration of the optical coupling member 1A, showing a side section including a central axis of an optical fiber F1. FIG. 2 shows a state in which an optical connector 20A is being inserted into an adapter 10. FIGS. 1 and 3 show a state in which insertion of the optical connector 20A into the adapter 10 is terminated. Further, in FIGS. 2 and 3, one of the two optical connectors 20A inserted into the adapter 10 is omitted.

The optical coupling member 1A couples the optical fiber F1 to the other optical fiber F1 while suppressing angle deviation around a central axis of the optical fiber F1. The optical fiber F1 is, for example, a multi-core fiber or a polarization-maintaining fiber.

As shown in FIGS. 1 to 3, the optical coupling member 1A of the embodiment includes the adapter 10 and the optical connector 20A. The adapter 10 has two insertion holes 10a and 10b arranged along a first direction (a direction along a central axis of the optical fiber F1 of the drawings). The optical connector 20A is inserted into the insertion hole 10a, and the other optical connector 20A is inserted into the insertion hole 10b.

Figure 4:
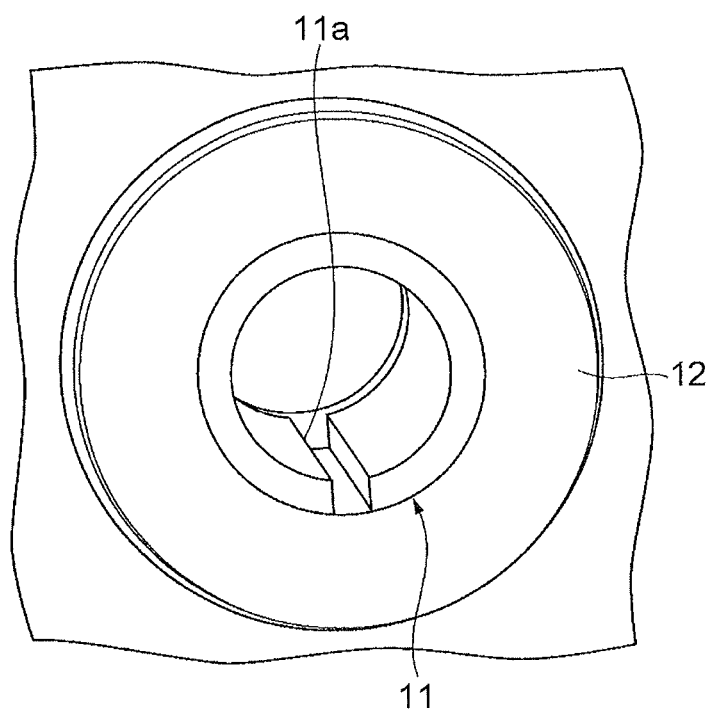
FIG. 4 is a perspective view showing an appearance of a sleeve.

As shown in FIGS. 2 and 3, the adapter 10 has a sleeve 11 and an adapter housing 12. The sleeve 11 has a cylindrical shape extending in the first direction, and the two insertion holes 10a and 10b come in communication with each other. A ferrule 21 (to be described below) is inserted into one opening of the sleeve 11. In addition, the ferrule 21 of the other optical connector 20A is inserted into the other opening of the sleeve 11 (not shown in FIGS. 2 and 3). These ferrules 21 abut each other in the sleeve 11. FIG. 4 is a perspective view showing an appearance of the sleeve 11. As shown in FIG. 4, the sleeve 11 has a slit 11a formed from the one opening to the other opening. An inner diameter of the sleeve 11 is slightly smaller than an outer diameter of the ferrule 21. For this reason, when the ferrule 21 is inserted into the sleeve 11, the ferrule 21 is appropriately held as the ferrule 21 slightly pushes and opens the slit 11a.

Returning to FIGS. 2 and 3, the adapter housing 12 accommodates the sleeve 11. The adapter housing 12 is a resin member, and constitutes a housing of the adapter 10. The adapter housing 12 has a shape of a so-called LC adapter. The insertion holes 10a and 10b are formed in the adapter housing 12. A shape of a cross-section perpendicular to the first direction of the insertion holes 10a and 10b is substantially a rectangular shape. Surfaces of the rectangular shape constitute inner surfaces of the adapter housing 12. These inner surfaces are facing to outer surfaces of a connector housing 22 of the optical connector 20A (to be described below).

The optical connector 20A has the ferrule 21 and the connector housing 22. The ferrule 21 is attached to a strand F11 of the optical fiber F1, and has a columnar shape. The optical fiber F1 is inserted to a through-hole that is formed from a rear end surface to a front end surface of the ferrule 21. A front end portion of the ferrule 21 is chamfered in a tapered shape to facilitate insertion into the sleeve 11. An outer circumferential surface of a rear end portion of the ferrule 21 is fixed to a flange 23. The flange 23 is movable in the connector housing 22 in an insertion direction (the first direction) toward the adapter 10. The flange 23 is biased in the insertion direction by a compression coil spring 24.

The connector housing 22 is a resin member, and constitutes a housing of the optical connector 20A. The connector housing 22 has a shape of a so-called LC connector. The connector housing 22 accommodates the ferrule 21, the flange 23, and the compression coil spring 24. A shape of a cross-section of the connector housing 22 perpendicular to the first direction is a substantially rectangular shape. Surfaces of the rectangular shape constitute outer surfaces of the connector housing 22. These outer surfaces are facing to the inner surfaces of the insertion hole 10a of the adapter 10.

The connector housing 22 has a latch lever 25. The latch lever 25 protrudes from one outer surface 22a of the connector housing 22. The latch lever 25 has an engagement section 25a configures a latch mechanism in a state in which the optical connector 20A is inserted into the adapter 10. The engagement section 25a engages with an engagement section 12a of the adapter housing 12 and prevents the optical connector 20A from dropping out from the adapter housing 12.

In addition, the latch lever 25 is a contact portion according to the embodiment. One end of the latch lever 25 is integrally formed with the connector housing 22. The other end of the latch lever 25 becomes free. Then, the latch lever 25 is elastically deformable to be bent from one end thereof as an origin. The latch lever 25 has a contact surface 25b inclined with respect to the insertion direction. The contact surface 25b contacts with an opening edge section of the adapter housing 12 when the connector housing 22 is inserted into the insertion hole 10a of the adapter housing 12. As shown in FIG. 2, when the optical connector 20A is inserted into the adapter 10, a timing at which the contact surface 25b contacts with the opening edge section of the adapter housing 12 is earlier than a timing at which the ferrule 21 starts to be inserted into the sleeve 11. Accordingly, the ferrule 21 is inserted into the sleeve 11 while the contact surface 25b contacts with the adapter housing 12.

In addition, as shown in FIG. 3, elastic deformation of the latch lever 25 is maintained even when insertion of the ferrule 21 into the sleeve 11 is terminated. As an example, elastic deformation of the latch lever 25 is maintained, because an upper surface 25c of the latch lever 25 abuts the inner surface of the insertion hole 10a such that the latch lever 25 is compressed from the inner surface of the insertion hole 10a, in a state in which the engagement section 25a is engaged with the engagement section 12a.

Figure 5:
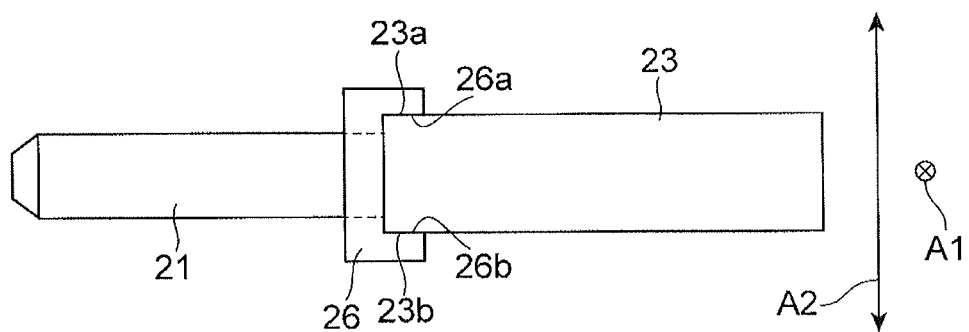
FIG. 5 is a side view showing an internal structure of a connector housing.
Figure 6:
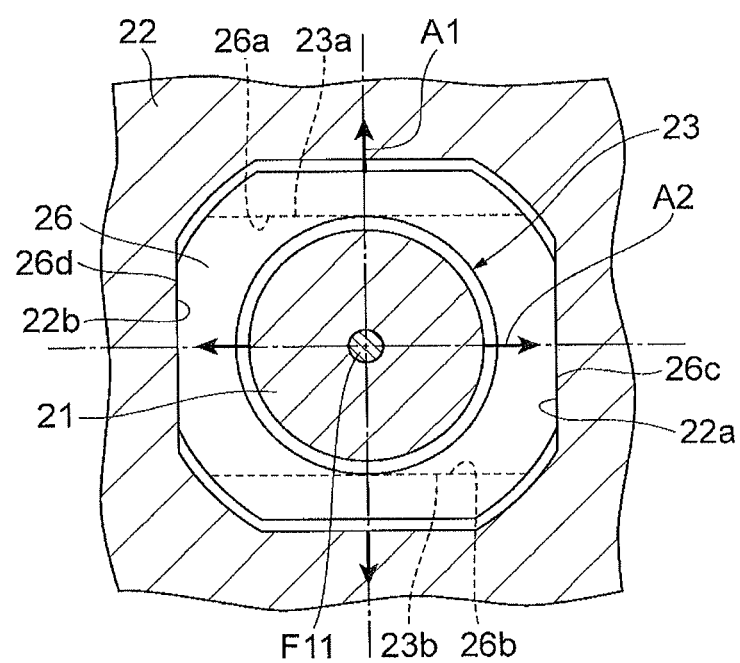
FIG. 6 is a partially enlarged view of a cross-section of the optical connector perpendicular to the central axis of the optical fiber.

Here, an internal structure of the optical connector 20A of the embodiment will be further described. FIG. 5 is a side view showing an internal structure of the connector housing 22 (the ferrule 21 and the flange 23). In addition, FIG. 6 is a partially enlarged view of a portion (in the vicinity of the ferrule 21) of a cross-section of the optical connector 20A perpendicular to a central axis of the optical fiber F1. As shown in FIGS. 5 and 6, the optical connector 20A further has a holding member 26. The holding member 26 allows relative movement between the connector housing 22 and the ferrule 21 in two directions (a vertical direction A1 and a horizontal direction A2 shown in FIG. 6). The two directions are perpendicular to the central axis of the optical fiber F1, and crossing each other at right angles. The holding member 26 holds a relative angle around the central axis of the optical fiber F1 with respect to the connector housing 22 and the ferrule 21 to prevent angle deviation therebetween.

Specifically, as shown in FIG. 5, the holding member 26 is fitted to the flange 23 from a front side thereof. For example, the holding member 26 has a pair of inner surfaces 26a and 26b extending in one direction (for example, the horizontal direction A2) and parallel to each other. The flange 23 has a pair of outer surfaces 23a and 23b extending in the one direction and parallel to each other. The inner surfaces 26a and 26b are slidable with respect to the outer surfaces 23a and 23b. Accordingly, a gap in the one direction is provided such that the ferrule 21 and the flange 23 are movable in the one direction with respect to the holding member 26.

In addition, as shown in FIG. 6, the holding member 26 is fitted into the connector housing 22. The holding member 26 further has a pair of outer surfaces 26c and 26d extending in the other direction (for example, the vertical direction A1) and parallel to each other. The connector housing 22 has a pair of inner surfaces 22a and 22b extending in the other direction and parallel to each other. The outer surfaces 26c and 26d are slidable with respect to the inner surfaces 22a and 22b. Accordingly, a gap in the other direction is provided such that the ferrule 21 and the flange 23 are movable in the other direction with respect to connector housing 22 via the holding member 26.

Figure 7:
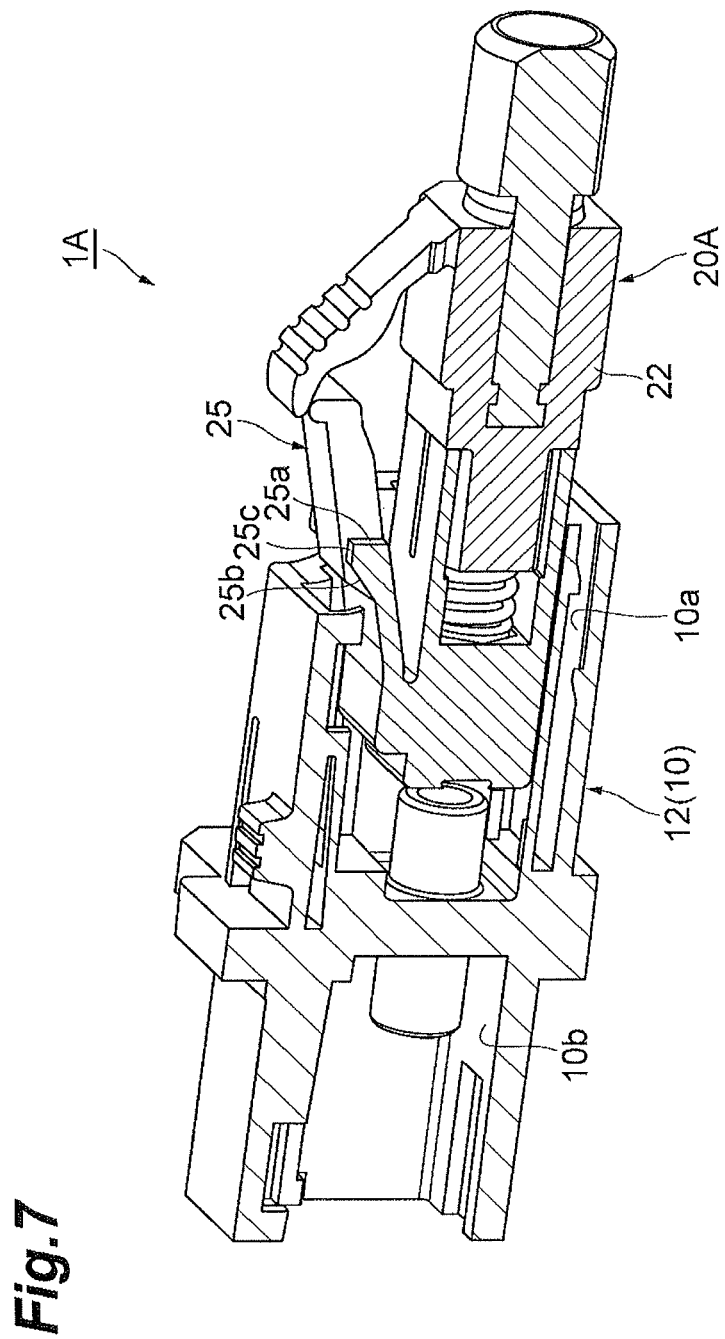
FIG. 7 is a partially cutout perspective cross-sectional view showing an operation of the optical coupling member.
Figure 8:
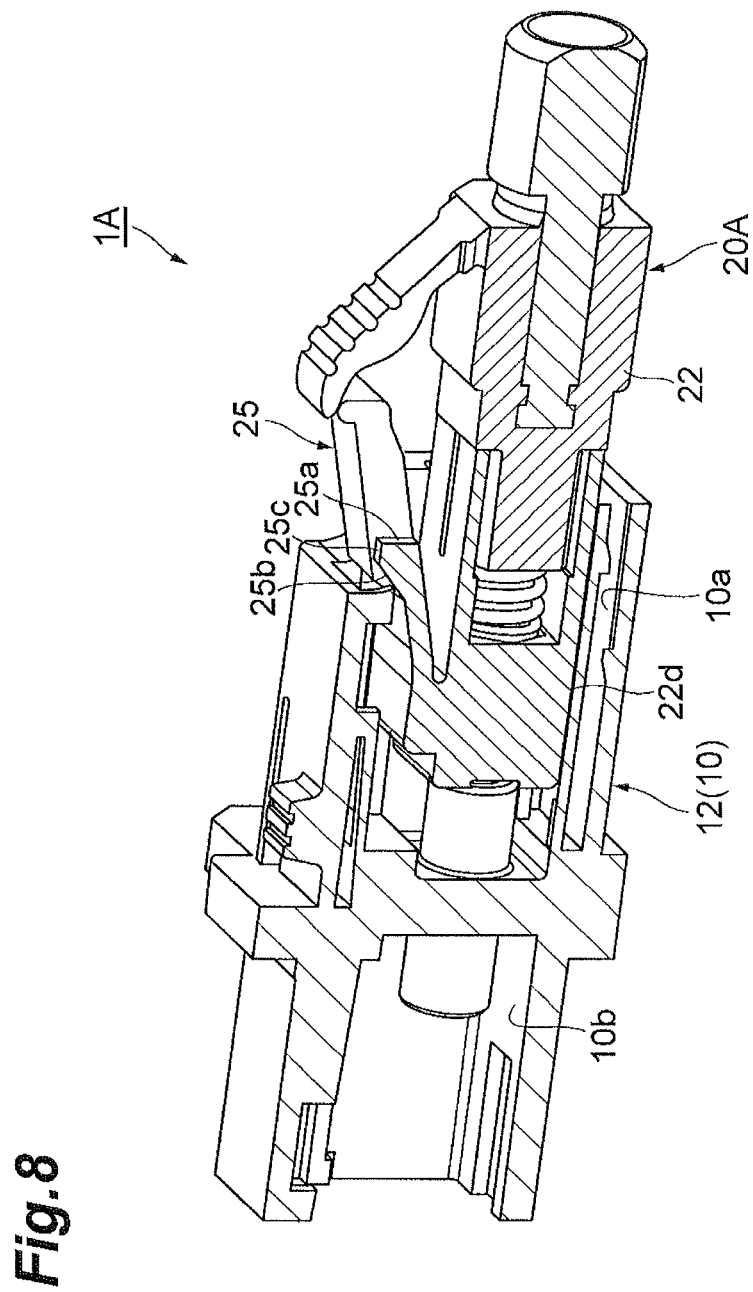
FIG. 8 is a partially cutout perspective cross-sectional view showing an operation of the optical coupling member.
Figure 9:
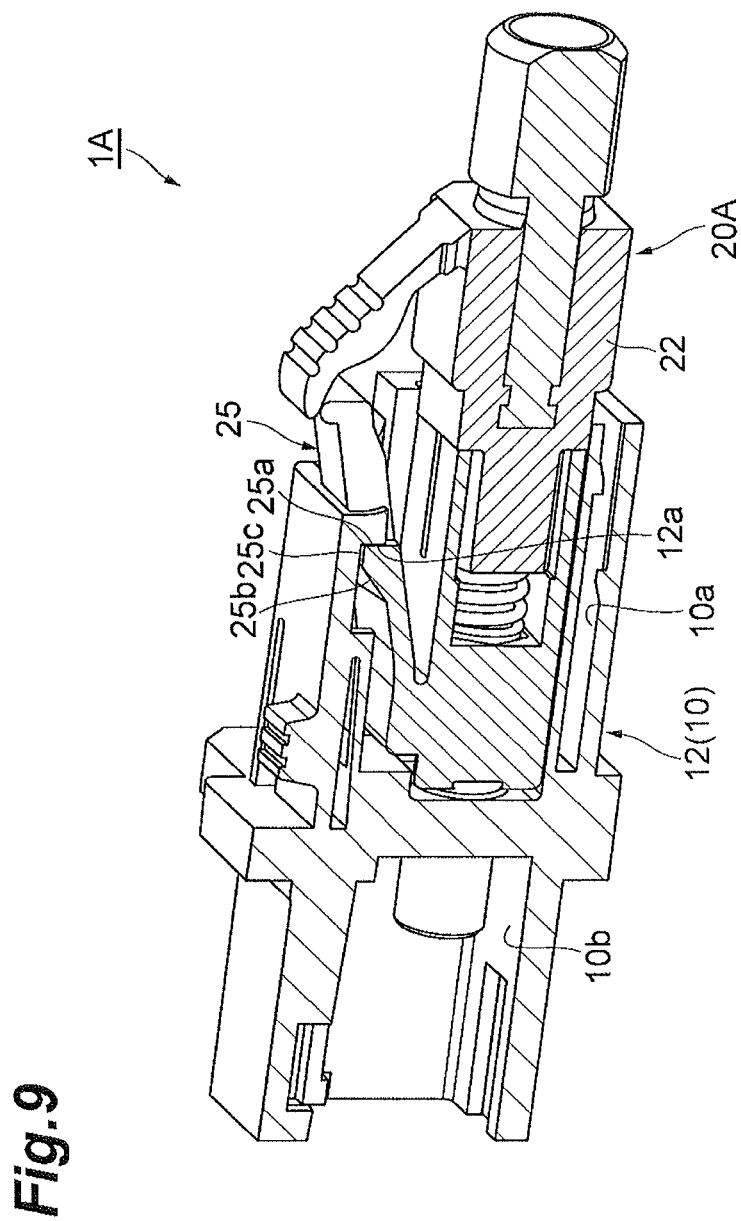
FIG. 9 is a partially cutout perspective cross-sectional view showing an operation of the optical coupling member.

FIGS. 7 to 9 are partially cutout perspective cross-sectional views showing an operation of the optical coupling member 1A. The operation of the optical coupling member 1A will be described with reference to FIGS. 7 to 9. First, as shown in FIG. 7, the optical connector 20A is started to be inserted into the insertion hole 10a. Here, the contact surface 25b does not contact with the opening edge section of the adapter housing 12. In addition, the ferrule 21 is not inserted into the sleeve 11.

Next, as shown in FIG. 8, the contact surface 25b contacts with the opening edge section of the adapter housing 12. Here, the ferrule 21 is still not inserted into the sleeve 11. After that, as insertion of the optical connector 20A progresses, the contact surface 25b is pressed against the opening edge section of the adapter housing 12, and thus the latch lever 25 is elastically deformed to be bent downward. Accordingly, an outer surface 22d of the connector housing 22 opposite to the latch lever 25 is pressed against the inner surface of the insertion hole 10a. After that, the ferrule 21 is inserted into the sleeve 11.

After that, as shown in FIG. 9, as the engagement section 25a is engaged with the engagement section 12a, the optical connector 20A is latched to the adapter 10. Here, insertion of the ferrule 21 into the sleeve 11 is terminated. In addition, elastic deformation of the latch lever 25 is maintained. That is, the upper surface 25c of the latch lever 25 abuts the inner surface of the insertion hole 10a such that the latch lever 25 is compressed from the inner surface of the insertion hole 10a, and thus elastic deformation of the latch lever 25 is maintained.

Advantageous effects obtained by the optical coupling member 1A of the above-mentioned embodiment will be described. In the optical coupling member 1A, when the optical connector 20A including the holding member 26 is inserted into the adapter 10, angle deviation around the central axis of the optical fiber F1 with respect to the connector housing 22 can be suppressed because of the contact surface 25b of the latch lever 25 contacting with the adapter housing 12 and being elastically deformed. Here, since the contact surface 25b is inclined with respect to the insertion direction, the latch lever 25 is elastically deformed with the insertion of the optical connector 20A into the adapter 10 progressing (see FIG. 8). Accordingly, the outer surface 22d of the connector housing 22 opposite to the latch lever 25 is pressed against the inner surface of the adapter housing 12. The outer surface 22d of the connector housing 22 is held against the inner surface of the adapter housing 12 by the compressive force. For this reason, angle deviation around the central axis of the optical fiber F1 with respect to the connector housing 22 and the adapter housing 12 is suppressed.

According to the optical coupling member 1A of the embodiment, angle deviation between the optical fiber F1 and the connector housing 22 is suppressed by the holding member 26, and angle deviation between the connector housing 22 and the adapter housing 12 is suppressed by elastic deformation of the latch lever 25. For this reason, angle deviation around the central axis of the optical fiber F1 with respect to the adapter housing 12 is sufficiently suppressed.

In addition, the optical connector 20A includes the flange 23. The holding member 26 has the pair of inner surfaces 26a and 26b and the pair of outer surfaces 26c and 26d. The pair of outer surfaces 23a and 23b of the flange 23 are slidable with respect to the pair of inner surfaces 26a and 26b of the holding member 26. The pair of inner surfaces 22a and 22b of the connector housing 22 are slidable with respect to the pair of outer surfaces 26c and 26d of the holding member 26. According to the above-mentioned configuration, the holding member 26 can allow relative movement between the connector housing 22 and the ferrule 21 in two directions (the vertical direction A1 and the horizontal direction A2), and hold a relative angle between the connector housing 22 and the ferrule 21.

In addition, when insertion of the ferrule 21 into the sleeve 11 is terminated, elastic deformation of the latch lever 25 may be maintained. Accordingly, even after insertion of the optical connector 20A into the adapter 10, angle deviation around the central axis of the optical fiber F1 can be suppressed.

In addition, the latch lever 25 configures a latching mechanism by engaging with the adapter housing 12 for preventing the optical connector 20A from dropping out from the adapter housing 12. In a state in which the latch lever 25 is engaged with the adapter housing 12, the latch lever 25 is elastically deformed by abutting the adapter housing 12. According to the above-mentioned configuration, elastic deformation of the latch lever 25 can be maintained when insertion of the ferrule 21 into the sleeve 11 is terminated.

(First Variant)

Figure 10:
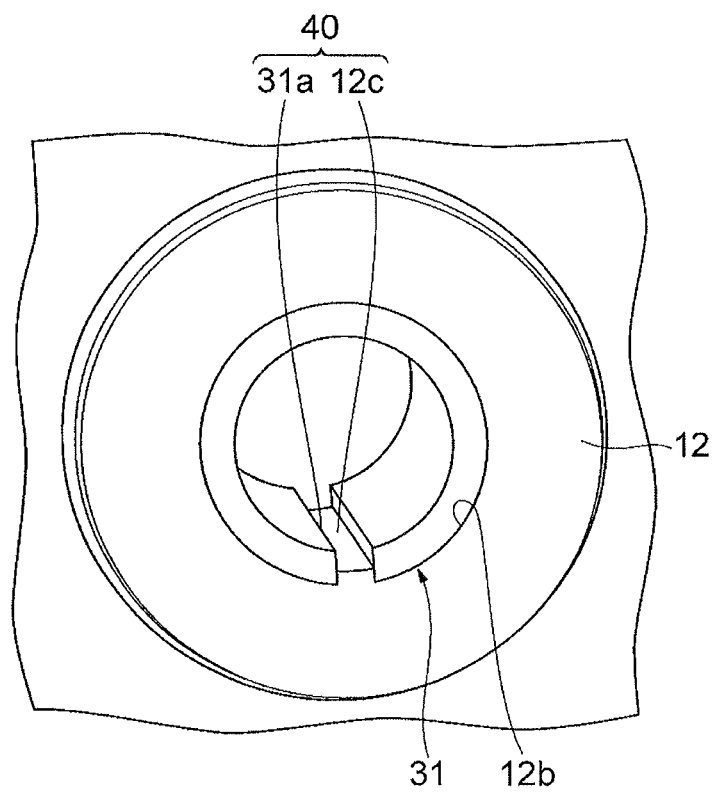
FIG. 10 is a perspective view showing an appearance of a sleeve according to a first variant.

FIG. 10 is a perspective view showing an appearance of a sleeve 31 according to a first variant of the embodiment. Like the sleeve 11 of the embodiment, the sleeve 31 has a slit 31a formed from one opening to the other opening. However, a convex section 12c protruding toward the central axis of the through-hole 12b is formed at an inner circumferential surface of a through-hole 12b of the adapter housing 12. The sleeve 31 is inserted into the through-hole 12b. Then, the slit 31a is fitted onto the convex section 12c. Accordingly, relative rotation of the sleeve 31 around the central axis with respect to the adapter housing 12 is restricted. The slit 31a and the convex section 12c constitute a restriction structure 40 in the variant.

That is, the adapter 10 may have the restriction structure 40 configured to restrict relative rotation around the central axis of the sleeve 31 with respect to the adapter housing 12. Accordingly, even after insertion of the optical connector 20A into the adapter 10, angle deviation around the central axis of the optical fiber F1 can be suppressed. For this reason, when insertion of the optical connector into the adapter 10 is terminated, elastic deformation of the latch lever 25 may not be maintained such that the sleeve 11 floats with respect to the adapter housing 12.

(Second Variant)

Figure 11:
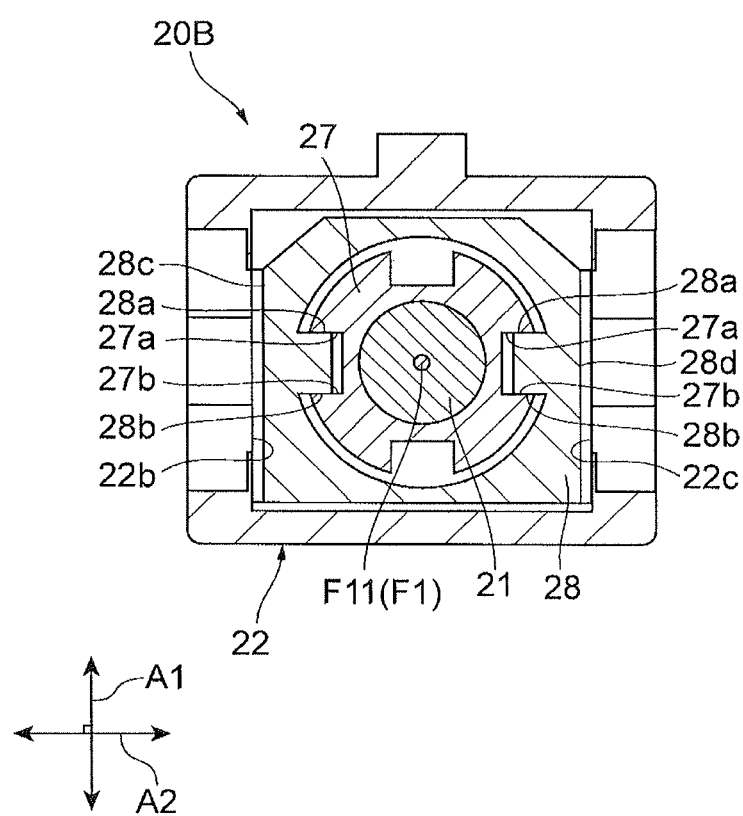
FIG. 11 is a view showing a cross-section perpendicular to a central axis of an optical connector according to a second variant.

FIG. 11 describes a cross-sectional view of an optical connector 20B according to a second variant of the embodiment. The optical connector 20B has the ferrule 21, the connector housing 22, a flange 27, and a holding member 28. Further, since configurations of the ferrule 21 and the connector housing 22 are the same as those of the first embodiment, detailed description thereof will be omitted.

The holding member 28 allows relative rotation between the connector housing 22 and the ferrule 21 in two directions (the vertical direction A1 and the horizontal direction A2). The two directions are perpendicular to the central axis of the optical fiber F1 and crossing each other at right angles. The holding member 28 holds a relative angle around the central axis of the optical fiber F1 with respect to the connector housing 22 and the ferrule 21, and angle deviation of these is prevented.

The holding member 28 is fitted into the flange 27. The holding member 28 has a pair of inner surfaces 28a and 28b extending in one direction (for example, the horizontal direction A2) and parallel to each other. The flange 27 has a pair of outer surfaces 27a and 27b extending in the one direction and parallel to each other. The inner surfaces 28a and 28b are slidable with respect to the outer surfaces 27a and 27b. Accordingly, a gap in the other direction is provided such that the ferrule 21 and the flange 27 are movable in the one direction with respect to the holding member 28.

In addition, the holding member 28 is fitted into the connector housing 22. The holding member 28 further has a pair of outer surfaces 28c and 28d extending in the other direction (for example, the vertical direction A1) of the two directions and parallel to each other. The outer surfaces 28c and 28d are slidable with respect to the inner surfaces 22b and 22c of the connector housing 22. Accordingly, a gap in the other direction is provided such that the ferrule 21 and the flange 27 are movable in the other direction with respect to connector housing 22 via the holding member 28.

The holding member configured to hold the relative angle around the central axis between the connector housing 22 and the ferrule 21 is not limited to the holding member 26 of the embodiment but may have various shapes such as the holding member 28 of the variant.

(Third Variant)

Figure 12:
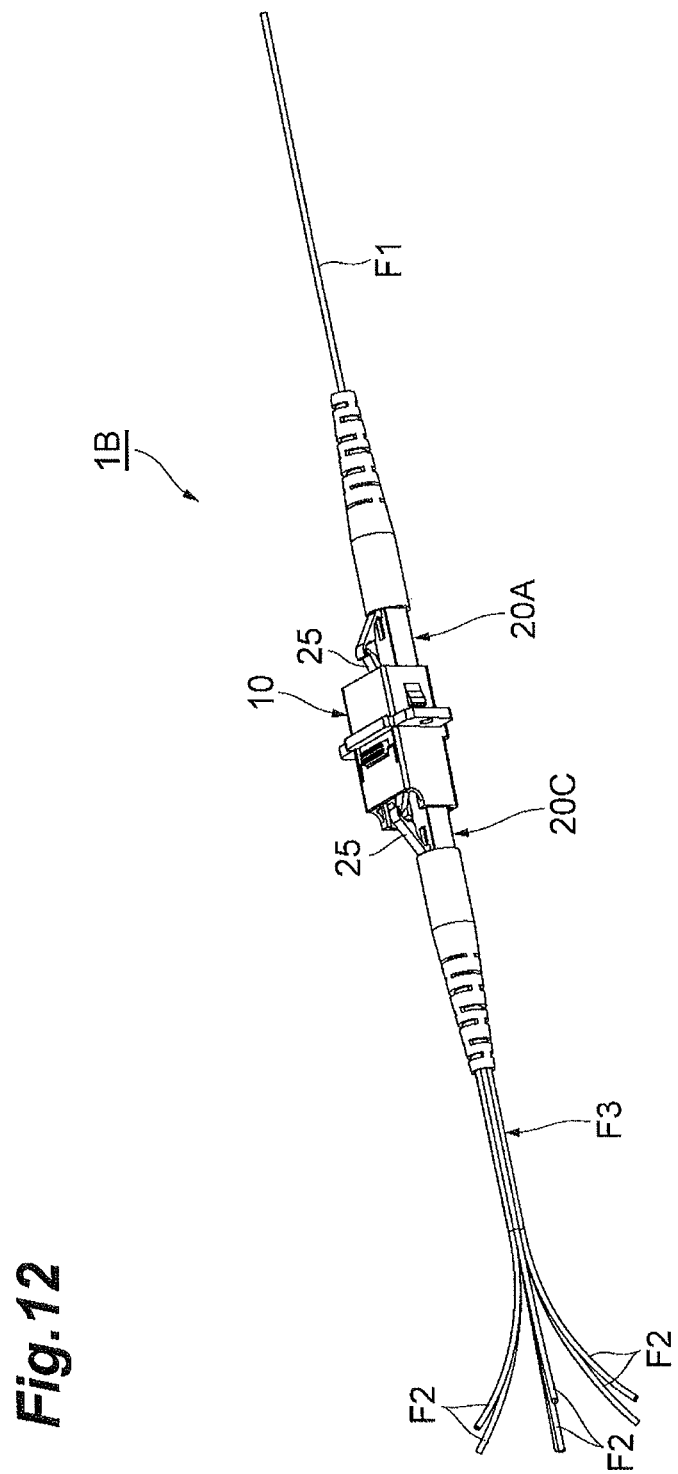
FIG. 12 is a perspective view showing an appearance of an optical coupling member serving as a fan-out adapter according to a third variant.

FIG. 12 is a perspective view of an optical coupling member 1B serving as a fan-out adapter according to a third variant of the embodiment. The optical coupling member 1B includes the adapter 10, the optical connector 20A, and an optical connector 20C. Among these, configurations of the adapter 10 and the optical connector 20A are the same as those of the embodiment. However, the optical fiber F1 of the variant is a multi-core fiber.

The optical connector 20C is inserted into the insertion hole 10b of the adapter 10 (see FIGS. 1 and 3). The optical connector 20C is different from the optical connector 20A by including a plurality of bundled single core fibers F2 as an optical fiber bundle F3. The optical connector 20C has the same configuration as the optical connector 20A except for the optical fiber.

Figure 13A:
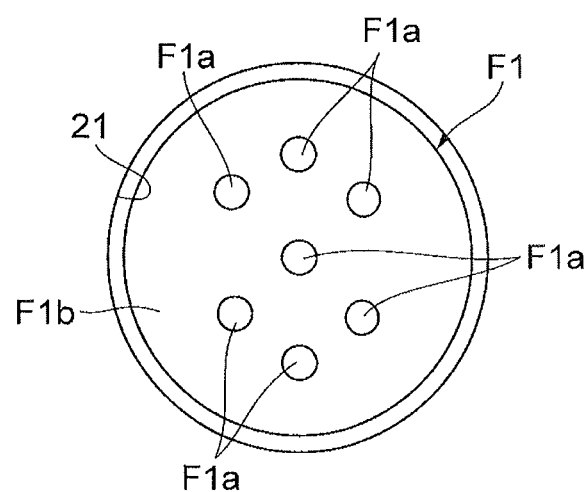
FIG. 13A is a cross-sectional view of a multi-core fiber.
Figure 13B:
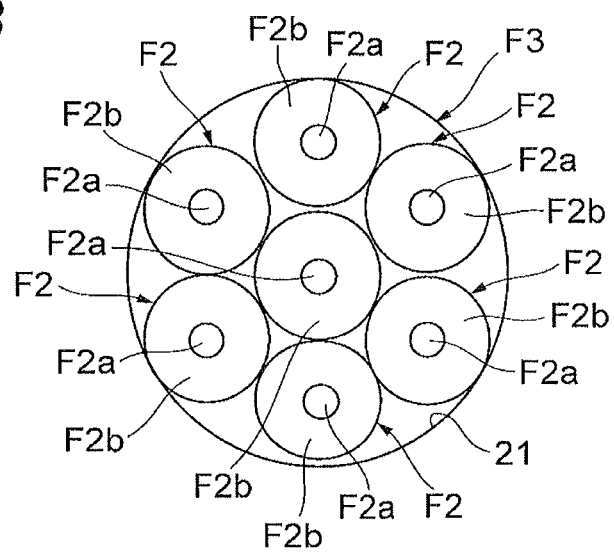
FIG. 13B is a cross-sectional view of an optical fiber bundle.

FIG. 13A is a cross-sectional view of the multi-core fiber F1. FIG. 13B is a cross-sectional view of the optical fiber bundle F3. As examply shown in FIG. 13A, the multi-core fiber F1 has one core F1a at a central section and six cores F1a at a peripheral section. These cores F1a are coated with the same clad F1b. The optical fiber bundle F3 has a single core fiber F2 at a central section and six single core fibers F2 at a peripheral section. Each of these single core fibers F2 has one core F2a and a clad F2b configured to coat the respective core F2a.

In the optical coupling member 1B, an end surface of the multi-core fiber F1 and an end surface of the optical fiber bundle F3 match each other in the sleeve 11. Here, the six cores F1a of the multi-core fiber F1 are optically coupled to the six cores F2a of the optical fiber bundle F3. According to the above-mentioned configuration, light passing through the multi-core fiber F1 is diverged into the six single core fibers F2. Alternatively, the light passing through the six single core fibers F2 is gathered to the multi-core fiber F1.

According to the optical coupling member 1B of the variant, angle deviation around the central axis with respect to the adapter housing 12 between the multi-core fiber F1 and the optical fiber bundle F3 can be suppressed. For this reason, the multi-core fiber F1 and the optical fiber bundle F3 can be efficiently optically coupled.

The optical coupling member according to the present invention is not limited to the above-mentioned embodiment but various modifications may be made. For example, in the embodiment, the latch lever is used as the contact portion of the present invention. However, the contact portion may not be in the form of a latch lever. The contact portion may have various structures as long as the contact portion has the contact surface inclined with respect to the insertion direction into the adapter and is elastically deformable. In addition, in the embodiment, while the LC adapter and the LC connector are exemplarily described, the present invention can also be applied to adapters and connectors according to other standards.

What is claimed is:

1. An optical coupling member comprising:
an optical connector; and
an adapter into which the optical connector is inserted to an insertion direction,
the optical connector includes:
a ferrule attached to an end portion of an optical fiber;
a connector housing for accommodating the ferrule, and the connector housing having an outer surface facing to an inner surface of the adapter, and a contact portion formed at the outer surface and including a contact surface inclined with respect to the insertion direction;
a holding member formed in the connector housing, and configured to hold a relative angle around a central axis of the optical fiber between the connector housing and the ferrule, and configured to allow relative movement between the connector housing and the ferrule in two directions perpendicular to the central axis and crossing each other at right angles, and wherein the holding member has a pair of inner surfaces extending in one direction of the two directions and parallel to each other, and a pair of outer surfaces extending in the other direction of the two directions and parallel to each other; and
a flange fixed to an outer surface of the ferrule, wherein the flange has a pair of outer surfaces extending in the one direction and parallel to each other;
the adapter includes:
a sleeve into which the ferrule is inserted; and
an adapter housing configured to accommodate the sleeve and define the inner surface, wherein the optical connector is configured to allow the contact surface to contact the adapter housing for elastically deforming the contact portion, before the ferrule is inserted into the sleeve;
wherein the connector housing has a pair of inner surfaces extending in the other direction and parallel to each other, and
the holding member is fitted into the flange such that the outer surfaces of the flange are slidable with respect to the inner surfaces of the holding member, and is fitted into the connector housing such that the inner surfaces of the connector housing are slidable with respect to the outer surfaces of the holding member.

2. The optical coupling member according to claim 1, wherein elastic deformation of the contact portion is maintained when insertion of the ferrule into the sleeve is terminated.

3. The optical coupling member according to claim 2, wherein the contact portion includes a latch lever engaging with the adapter housing for elastically deforming the contact portion and preventing the optical connector from dropping out from the adapter housing.

4. The optical coupling member according to claim 1, wherein the adapter further includes a restriction structure configured to restrict relative rotation of the sleeve around the central axis with respect to the adapter housing.

5. The optical coupling member according to claim 1, wherein the optical fiber is a multi-core fiber or a polarization-maintaining fiber.

6. An optical coupling member comprising:
an optical connector, wherein the optical connector further comprises a flange fixed to an outer surface of a ferrule; and
an adapter into which the optical connector is inserted to an insertion direction,
the optical connector includes:
  the ferrule attached to an end portion of an optical fiber;
  a connector housing for accommodating the ferrule, and the connector housing having an outer surface facing to an inner surface of the adapter, and a contact portion formed at the outer surface and including a contact surface inclined with respect to the insertion direction; and
  a holding member formed in the connector housing, wherein the holding member has a pair of inner surfaces extending in one direction of the two directions and parallel to each other, and wherein the holding member is configured to hold a relative angle around a central axis of the optical fiber between the connector housing and the ferrule, and configured to allow relative movement between the connector housing and the ferrule in two directions perpendicular to the central axis and crossing each other at right angles, the adapter includes:
  a sleeve into which the ferrule is inserted; and
  an adapter housing configured to accommodate the sleeve and define the inner surface, wherein a first length in the adapter between an opening edge section of the sleeve and an opening edge section of the adapter housing is longer than a second length in the connector between an end part of the ferrule and the contact surface;
  a pair of outer surfaces extending in the other direction of the two directions and parallel to each other,
  the flange has a pair of outer surfaces extending in the one direction and parallel to each other,
  the connector housing has a pair of inner surfaces extending in the other direction and parallel to each other, and
  the holding member is fitted into the flange such that the outer surfaces of the flange are slidable with respect to the inner surfaces of the holding member, and is fitted into the connector housing such that the inner surfaces of the connector housing are slidable with respect to the outer surfaces of the holding member.

7. The optical coupling member according to claim 6,
wherein the optical connector is configured to allow the contact surface to contact the adapter housing for elastically deforming the contact portion, before the ferrule is inserted into the sleeve; and
wherein elastic deformation of the contact portion is maintained when insertion of the ferrule into the sleeve is terminated.

8. The optical coupling member according to claim 7, wherein the contact portion includes a latch lever engaging with the adapter housing for elastically deforming the contact portion and preventing the optical connector from dropping out from the adapter housing.

9. The optical coupling member according to claim 6, wherein the adapter further includes a restriction structure configured to restrict relative rotation of the sleeve around the central axis with respect to the adapter housing.

10. The optical coupling member according to claim 6, wherein the optical fiber is a multi-core fiber or a polarization-maintaining fiber.

* * * * *